No. 873,581. PATENTED DEC. 10, 1907.
F. R. McQUEEN.
SUBAQUEOUS CONCRETE CONSTRUCTION.
APPLICATION FILED APR. 4, 1907.
2 SHEETS—SHEET 2.
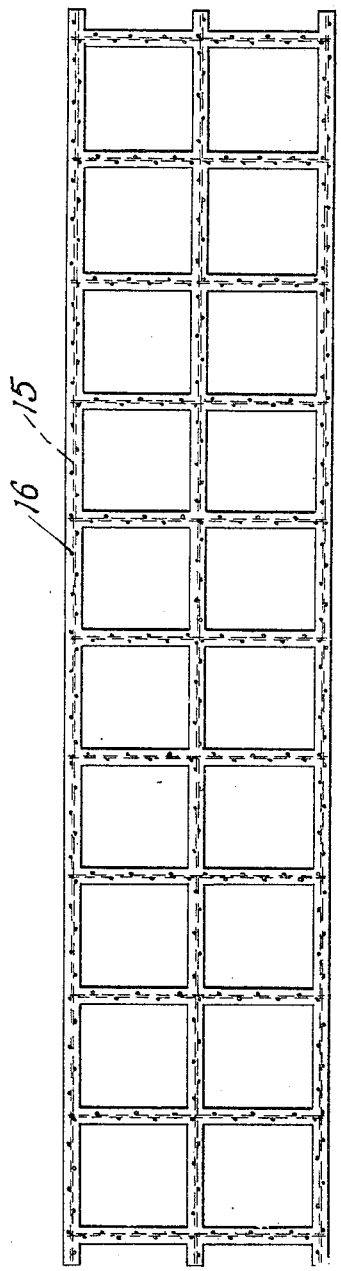
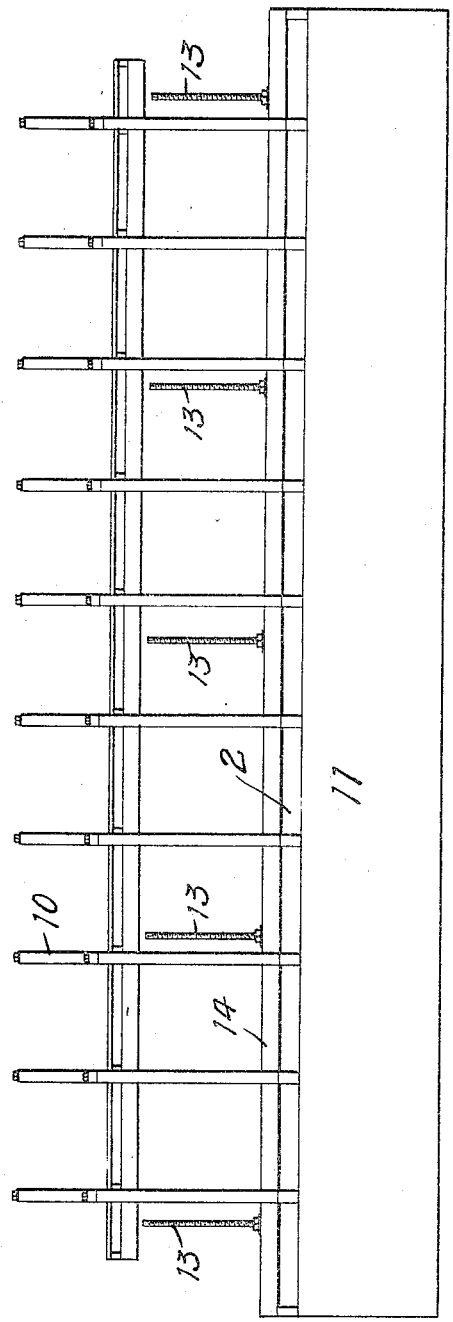
WITNESSES
INVENTOR
FINLAY R. McQUEEN
BY
HIS ATTORNEYS

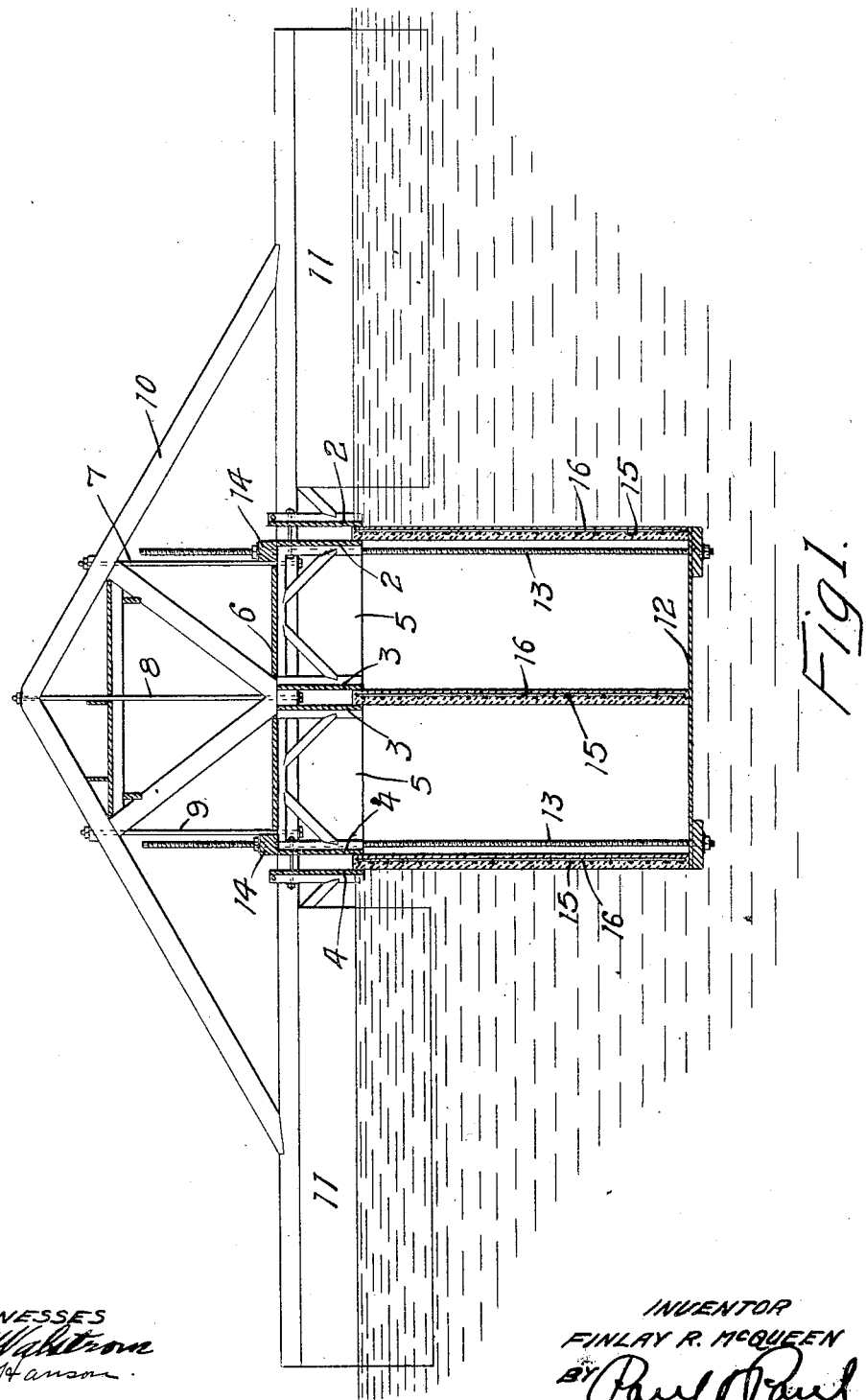

UNITED STATES PATENT OFFICE.

FINLAY R. McQUEEN, OF MINNEAPOLIS, MINNESOTA, ASSIGNOR OF ONE-HALF TO CHARLES H. SCOTT, OF MINNEAPOLIS, MINNESOTA.

SUBAQUEOUS CONCRETE CONSTRUCTION.

No. 873,581.　　　Specification of Letters Patent.　　　Patented Dec. 10, 1907.

Application filed April 4, 1907. Serial No. 366,279.

*To all whom it may concern:*

Be it known that I, FINLAY R. McQUEEN, of Minneapolis, Hennepin county, Minnesota, have invented certain new and useful Improvements in Subaqueous Concrete Construction, of which the following is a specification.

My invention relates to a process of subaqueous concrete construction, and the object of the invention is to provide a process whereby docks and other sub-aqueous structures may be economically and expeditiously built without the use of piling, cribbing or cofferdam construction of any kind.

A further object is to provide a dock construction that will be very strong and durable, from which all timber is eliminated, and hence proof against the teredo worm which is very destructive to timber docks in tropical countries.

My invention consists in a process of subaqueous concrete construction which consists in molding a section of the concrete structure at the surface of the water, lowering said section into the water and partly submerging the same, then molding another section upon the first section, and so on successively until the structure rests upon the ground or bottom foundation.

In the accompanying drawings, forming part of this specification; Figure 1 is a sectional view of a mold with means for supporting it at the surface of the water, illustrating the manner of carrying out my process. Fig. 2 is a side view of the mold which I prefer to employ. Fig. 3 is a top view of a dock structure made by my improved process.

In carrying out my invention as applied for instance to the building of a dock, I provide a suitable mold which is shown in the accompanying drawings to consist of side and middle plates 2, 3 and 4 arranged in pairs with suitable spaces between the plates of each pair according to the desired thickness of the wall of the dock. Cross plates are provided at intervals between and connecting the plates 2, 3 and 4. A floor 6 is preferably provided for the mold, and rods 7, 8 and 9 adjustably support the mold from a bridge or truss frame 10 that is supported upon barges or pontoons 11 of sufficient size to support the mold and the sections of the dock as they are formed.

12 represents the bottom of the mold supported by means of screw rods 13 that pass through timbers 14 and are adjustable therein for the purpose of raising or lowering the bottom, and are also removable at their lower ends from the bottom to permit their detachment when the dock is completed. There may be any desired number of these rods according to the size of the dock and the weight of the sections.

I have shown the dock having a crib construction, formed in a series of squares, but do not wish to confine myself to this form as any other type may be employed according to the location and for the purpose for which the dock is to be used.

In molding the sections the forms are filled with the plastic mixture and as soon as it has set sufficiently the bottom of the mold is lowered and the section allowed to drop with it until its upper edge is nearly down to the bottom of the mold. The form is then filled again and the sections lowered and the operation repeated until the bottom of the mold rests upon the ground or upon the dock foundation.

Reinforcing wires 15 are preferably arranged horizontally in the sections during the molding operation and I prefer also to provide bonding rods 16 extending vertically through the sections. These rods are preferably of suitable length to bind the sections securely together and may be alternately arranged from side to side of the dock wall, as indicated in Fig. 3. If preferred, I may embed rods in the bottom section and make them of sufficient length to extend vertically through each section as it is molded from the top to the bottom of the dock. This construction, however, would be obvious from what is already illustrated and need not be shown in detail. When the bottom of the mold has become firmly seated on the ground or dock foundation the lowering screws will be removed and the mold floated away from the top of the dock. The lowering screws will have ball bearings in the supporting timbers or frame work 14 and each section will be lowered by loosening the lock nuts on the screws.

A dock of this construction will be very durable, the labor will be very much less than by the usual method of building and by providing the barges with the truss construction between them supporting the mold and the cribbing, I am able to build the dock in one place and float it to its final location.

While I have illustrated and described the use of the process in forming a concrete dock structure, I do not wish to be limited to such use of the process as it may be used in forming any sub-aqueous concrete structures.

I claim as my invention:

1. The method of forming sub-aqueous concrete structures which consists in molding a section of said structure above the surface of the water, lowering said section into the water but leaving the top of the section above the water, molding another section on top of the first section, and so on successively until the bottom section rests upon the ground.

2. A process of sub-aqueous construction which consists in molding a section of plastic material at the surface of the water, lowering the bottom of the mold and the section thereon, then molding a second section upon the first and so on successively until the bottom of the structure rests upon the ground or bottom foundation.

3. A process of dock construction which consists in molding and reinforcing a section of plastic material at the surface of the water, lowering the bottom of the mold and the section thereon, then molding a second section upon the first, reinforcing each section as it is formed, and so on successively until the bottom of the structure rests upon the ground or bottom foundation.

4. A process of dock construction which consists in molding a section of plastic material at the surface of the water, lowering the bottom of the mold and the section thereon, then molding a series of sections successively upon the first one and upon one another, and bonding them together during the molding operation, and lowering all of the sections, as each one is molded, until the bottom one rests upon the ground.

In witness whereof, I have hereunto set my hand this 21st day of March 1907.

FINLAY R. McQUEEN.

Witnesses:
 A. C. PAUL,
 C. G. HANSON.